US009462563B2

United States Patent
Siomina et al.

(10) Patent No.: US 9,462,563 B2
(45) Date of Patent: Oct. 4, 2016

(54) METHOD AND APPARATUS FOR COMPENSATING SIGNAL TIMING MEASUREMENTS FOR DIFFERENCES IN SIGNAL FREQUENCIES

(75) Inventors: Iana Siomina, Solna (SE); Muhammad Kazmi, Bromma (SE)

(73) Assignee: Optis Cellular Technology, LLC, Plano, TX (US)

( * ) Notice: Subject to any disclaimer, the term of this patent is extended or adjusted under 35 U.S.C. 154(b) by 283 days.

(21) Appl. No.: 13/257,605

(22) PCT Filed: Aug. 2, 2011

(86) PCT No.: PCT/SE2011/050975
§ 371 (c)(1),
(2), (4) Date: Sep. 20, 2011

(87) PCT Pub. No.: WO2012/099515
PCT Pub. Date: Jul. 26, 2012

(65) Prior Publication Data
US 2012/0182874 A1    Jul. 19, 2012

Related U.S. Application Data

(60) Provisional application No. 61/433,452, filed on Jan. 17, 2011.

(51) Int. Cl.
*H04L 12/26* (2006.01)
*H04W 56/00* (2009.01)
(Continued)

(52) U.S. Cl.
CPC ........... *H04W 56/004* (2013.01); *H04W 24/08* (2013.01); *H04W 64/00* (2013.01)

(58) Field of Classification Search
USPC ........... 370/421, 503–520; 455/456.1, 67.11, 455/456.2; 375/355, 362, 363, 364, 371, 375/373
See application file for complete search history.

(56) References Cited

U.S. PATENT DOCUMENTS 5,839,071 A    11/1998  Johnson
6,829,253 B1 *  12/2004  Koorapaty et al. ........... 370/514
(Continued)

FOREIGN PATENT DOCUMENTS

WO  WO 2009096839 A1 *  8/2009 ........... G01S 5/0018
WO     2010151213 A1    12/2010
WO  WO 2011074201 A1 *  6/2011 ........... H04W 74/008

OTHER PUBLICATIONS

ETSI TS 136 355 V9.3.0, LTE; Evolved Universal Terrestrial Radio Access (E-UTRA); LTE Positioning Protocol (LPP) (3GPP TS 36.355 version 9.3.0 Release 9) Oct. 2010, European Telecommunications Standards Institute 2010, pp. 11, 41.*
(Continued)

*Primary Examiner* — Hanh N Nguyen
*Assistant Examiner* — Jose Perez

(57) ABSTRACT

Methods (100) and apparatuses (12, 24, 38) taught herein advantageously facilitate use of timing measurements in wireless communication networks (10) where radio signal timing measurements involve signals at different carrier frequencies. The methods and apparatuses in particular compensate such timing measurements for expected discrepancies in the measurements that arise from frequency-dependent differences in the propagation behavior of the radio signals being measured. In a non-limiting example, measurements at two or more frequencies may be compensated for the frequency distance between those frequencies, or with respect to a reference frequency. In such cases, timing measurements determined for one or more other radio signals are compensated as a function of the frequency distance between the reference frequency and the frequencies of such other radio signals.

31 Claims, 8 Drawing Sheets

(51) Int. Cl.
*H04W 24/08* (2009.01)
*H04W 64/00* (2009.01)

(56) References Cited

U.S. PATENT DOCUMENTS

| | | | | |
|---|---|---|---|---|
| 2003/0092448 | A1* | 5/2003 | Forstrom et al. | 455/456 |
| 2004/0157621 | A1* | 8/2004 | Yamasaki | H04W 64/00 455/456.1 |
| 2005/0124345 | A1* | 6/2005 | Laroia et al. | 455/437 |
| 2005/0206566 | A1* | 9/2005 | Stilp et al. | 342/455 |
| 2006/0089154 | A1* | 4/2006 | Laroia et al. | 455/456.2 |
| 2008/0032705 | A1* | 2/2008 | Patel et al. | 455/456.1 |
| 2008/0287116 | A1* | 11/2008 | Drane | G01S 5/0036 455/423 |
| 2009/0054075 | A1* | 2/2009 | Boejer et al. | 455/456.1 |
| 2010/0197300 | A1* | 8/2010 | Van Der Velde et al. | 455/425 |
| 2010/0271263 | A1* | 10/2010 | Moshfeghi | 342/378 |
| 2010/0331012 | A1* | 12/2010 | Zhang | 455/456.2 |
| 2011/0158116 | A1* | 6/2011 | Tenny | H04W 56/0045 370/252 |
| 2011/0243102 | A1* | 10/2011 | Sebire et al. | 370/336 |
| 2011/0249577 | A1* | 10/2011 | Chin | H04B 1/7087 370/252 |
| 2012/0008600 | A1* | 1/2012 | Marinier et al. | 370/336 |
| 2012/0015667 | A1* | 1/2012 | Woo et al. | 455/456.1 |

OTHER PUBLICATIONS

ETSI TS 136 355 V9.3.0 (Oct. 2010), LTE; Evolved Universal Terrestrial Radio Access (E-UTRA); LTE Positioning Protocol (LPP) (3GPP TS 36.355 version 9.3.0 Release 9) pp. 12, 37-39, 48.*

ETSI TS 136 214 V9.1.0 (Apr. 2010), LTE; Evolved Universal Terrestrial Radio Access (E-UTRA); Physical layer—Measurements (3GPP TS 36.214 version 9.1.0 Release 9) pp. 7, 12.*

ITRI, Jan. 2010, (R2-100560 3GPP TSG RAN WG2 #68 bis "Time Alignment Timer for different TA") whole document.*

3GPP (FTP listing of TSG RAN WG2 #68 bis), captured from www.3gpp.org showing R2-100560 as available under/ftp/tsg_ran/wg2_rl2/TSGR2_68bis/Docs/ in Jan. 2010, p. 9.*

NTT DOCOMO, Inc., May 2010, (R2-103221 3GPP TSG-RAN2#70 "Reference DL CC for TA") whole document.*

NTT DOCOMO, Inc., May 2010, (R2-103221 3GPP TSG-RAN2#70 "Reference DL CC for TA").*

ETSI TS 136 355 V9.3.0 (Oct. 2010), LTE; Evolved Universal Terrestrial Radio Access (E-UTRA); LTE Positioning Protocol (LPP) (3GPP TS 36.355 version 9.3.0 Release 9) pp. 9-12, 37-39, 48.*

ETSI TS 136 214 V9.1.0 (Apr. 2010), LTE; Evolved Universal Terrestrial Radio Access (E-UTRA); Physical layer—Measurements (3GPP TS 36.214 version 9.1.0 Release 9) pp. 6, 7, 10, 12.*

"Central Processing Unit." Pfaffenberger, Bryan. Webster's New World Computer Dictionary, Ninth Edition. New York: Hungry Minds, Inc., 2001, Print.*

Huawei, "Different Timing Advance Impact on Carrier Aggregation", 3GPP TSG RAN WG2 Meeting #67bis, Miyazaki, Japan, R2-095815, Oct. 12-Oct. 16, 2009.

International Search Report and Written Opinion for PCT/SE2011/050975, dated Dec. 7, 2011, 12 pgs.

International Preliminary Report on Patentability for PCT/SE2011/050975, dated Jul. 17, 2014, 6 pgs.

De Podesta, Michael, "Understanding the Properties of Matter," Second Edition, Section 5.8, p. 131, 2002.

* cited by examiner

METHOD AND APPARATUS FOR COMPENSATING SIGNAL TIMING MEASUREMENTS FOR DIFFERENCES IN SIGNAL FREQUENCIES

RELATED APPLICATIONS

This application claims priority form the U.S. provisional patent application filed on 17 Jan. 2011 and assigned Application No. 61/433,452, which is incorporated herein by reference.

FIELD OF THE INVENTION

The present invention generally relates to use of signal timing measurements in wireless communication networks, and particularly relates to compensating timing measurements for differences in signal frequency.

BACKGROUND

Positioning-related timing measurements represent an area of current and growing interest, as wireless communication networks increasingly provide or otherwise support positioning functions. Such measurements include but are not limited to Time-of-Arrival (TOA) measurements on signals to/from mobile stations and base stations. Other examples of timing measurements are timing advance (TA), Round Trip Time (RTT) and one way propagation delay. In a particular example, a mobile station uses a downlink signal received from a reference cell to establish a reference timing, and then determines additional timing values for the downlink signals received from one or more other cells. The mobile station may determine the relative timing of these other signals with respect to the reference cell, as a basis for determining the mobile station's positioning, or may provide the raw timing values to another node (e.g., a base station and/or positioning node) for such a determination.

Taking the example of a network based on the Long Term Evolution (LTE) standards promulgated by the Third Generation Partnership Project (3GPP), multiple positioning methods to support "Location Based Services" (LBS) may be used separately or in some combination. The particular method(s) depends on where the measurements are to be performed and how the final position is to be calculated. Further variables include how quickly the measurement is to be provided and at what level of accuracy or uncertainty.

Examples include UE-based measurements, where the timing measurements are made at the user equipment (UE); UE-assisted measurements, where the timing measurements are not made at the UE, at least not in final form, but the UE provides assistance data, such as raw timing data. Additionally, LTE provides for network-based measurements, such as where measurements are made by the eNodeB or at another network node (such as a positioning node). LTE further provides for network-assisted timing measurements, where the network does not perform the timing measurements but does provide data aiding or otherwise enabling those measurements, e.g., at a UE.

In more detail, the LTE location architecture defines an "evolved serving mobile location center," which is referred to as an "E-SMLC." The E-SMLC functions as a server for supporting or performing positioning activities. A mobility management entity (MME) in the LTE core network provides positioning requests to the E-SMLC, and the E-SMLC in turn configures the LTE device, such as a UE, for performing one or more positioning measurements. The configuration of the UE is carried out by using signaling which follows the LTE Positioning Protocol, referred to as "LPP." To support positioning operations, LPP supports the exchange of (measurement) capability information, assistance data to aid the positioning-related measurements, such as signal timing measurements, and location information that may be exchanged either as the measurements necessary to determine location, or the location determination.

For LTE and other network types, making accurate timing-related measurements is becoming increasingly challenging as the radio service configurations of such networks become more complex. For example, network capacities are being increased through the use of multi-carrier arrangements where multiple carriers at different frequencies are used to serve a larger numbers of users thin the same cell and/or to provide users with higher aggregate data rates. Similarly, different uplink and downlink frequencies, or sets of such frequencies, may be used in the same cell or across neighboring cells. Making accurate relative timing measurements on a mix of uplink and downlink signals, or across signals at substantially different frequencies, introduces a number of significant complications that are not well addressed using conventional approaches to timing measurement.

SUMMARY

Methods and apparatuses taught herein advantageously facilitate use of timing measurements in wireless communication networks where radio signal timing measurements involve signals at different carrier frequencies. The methods and apparatuses in particular compensate such timing measurements for expected discrepancies in the measurements that arise from frequency-dependent differences in the propagation behavior of the radio signals being measured. In a non-limiting example, measurements at two or more frequencies may be compensated for the frequency distance between those frequencies, or with respect to a reference frequency. In such cases, timing measurements determined for one or more other radio signals are compensated as a function of the frequency distance between the reference frequency and the frequencies of such other radio signals.

So compensated, the relative timing measurement(s) may meet certain pre-determined quality or reporting delay requirements that would not have been met otherwise. Of course, the present invention in its various embodiments provides a number of additional advantages, including but not limited to: conditional compensation wherein timing measurements are or are not compensated in dependence on one or more parameters, such as the frequency distance between the radio signals for which relative timing is being measured, and/or the accuracy requirements that apply to the timing measurement; both consolidated and distributed implementations, where timing measurements are made and compensated in a given node, or where timing measurements are made in one node and compensated in another node; and the distribution of assistance data, where one node provides the compensation value(s) to be used for timing compensation to another node that makes or receives the timing measurements to be compensated.

One embodiment presented herein comprises a method of compensating timing measurements made in a wireless communication network having multiple carriers operating at different carrier frequencies. The method is implemented in a node configured for operation in the wireless communication network and includes obtaining a timing measurement performed over first and second radio signals at first and second carrier frequencies, respectively. The method continues with determining whether timing compensation is needed for the timing measurement based at least in part on the frequency distance between the first and second carrier frequencies.

When timing compensation is needed, the method includes compensating the timing measurement using a compensation value that compensates the timing measurement for frequency-dependent propagation differences between the first and second carrier frequencies, and further includes providing the compensated timing measurement for use in processing dependent on said tinning measurement. For example, the compensated timing measurement may be provided to associated, local processing circuitry within the node, e.g., for use in making a timing correction or computing location, or the compensated timing measurement may be transferred to another node via a communication interface of the node.

In a related embodiment, a node is configured for operation in a wireless communication network having multiple carriers operating at different carrier frequencies. The node may be a fixed node within the network itself, such as a base station, location measurement unit (LMU) or positioning node, or it may be a mobile node, such as an item of user equipment (a "UE") that may move within the various cells comprising the wireless communication network.

In an example configuration, the node includes a communication interface configured for communicating with one or more other nodes within the wireless communication network. In the UE case, the communication interface comprises, for example, a cellular radio transceiver and associated communication processing and control circuits. In the base station or positioning node case, the communication interface comprises, for example, one or more backhaul or other inter-node network interfaces that provide for the exchange of control and/or data signaling between fixed nodes within the wireless communication network.

The node further includes one or more processing circuits that are configured to obtain a timing measurement performed over first and second radio signals at first and second carrier frequencies, respectively, and to determine whether timing compensation is needed for the timing measurement based at least in part on the frequency distance between the first and second carrier frequencies. Here, one should appreciate that the node may obtain the timing measurement by making the requisite signal timing measurements, or it may obtain the timing measurement based on receiving it from another node.

When the node determines that timing compensation is needed for the timing measurement, the processing circuit(s) at issue within the node compensates the timing measurement using a compensation value that compensates the timing measurement for frequency-dependent propagation differences between the first and second carrier frequencies. In this respect, the processing circuit(s) may be configured to execute a function that yields a calculated compensation value in dependence on the value of the frequency distance, or the processing circuit(s) may access a memory or other data storage mechanism that includes, e.g., a look-up table that includes pre-computed compensation values that are indexed by frequency distance. As a non-limiting example, a compensation value may be provided for each of a number of ranges or sizes of frequency distance, and the processing circuit(s) select the compensation value to use from the table based on the index corresponding to the frequency distance associated with the timing measurement being compensated.

Compensating the timing measurement may comprise scaling it up or down in magnitude, according to a scaling factor to be used as the compensation value. In another contemplated embodiment, the compensation value(s) are offsets to be added to or subtracted from the (uncompensated) timing measurement. For example, the timing measurement may include or depend on calculated arrival times for first and second radio signals, where the first radio signal is at a carrier frequency of 700 MHz for example, and the second radio signal is at a carrier frequency of 1900 MHz.

In this case, the second radio signal generally will see a more dispersive channel than the first radio signal, as its higher frequency leaves it more vulnerable to reflection, etc. Thus, as a non-limiting example of the type of compensation contemplated herein, the timing measurement reflects a difference in arrival times between the first and second radio signals and the processing circuit(s) reduce that arrival time difference by an amount that corrects for the dispersion-related propagation differences between the first and second radio signals. Furthermore due to higher level of dispersion, the received second radio signal may also be weaker. This deteriorates the accuracy of the second radio signal compared to the first radio signal. Furthermore, the different levels of signal dispersions experienced by the first and second radio signals in turn adversely affect the overall accuracy of the measurement involving the two signals.

Regardless of the particular approach taken to compensation, the involved processing circuit(s) at the node is/are configured to provide the compensated timing measurement for use in processing that is dependent on said timing measurement. To the extent that such processing is carried out in the node, such "providing" can be understood as making the compensated timing measurement available to local processing circuitry within the node, so that the circuit(s) within the node that actually carry out timing corrections, positioning determination, or other timing-measurement-dependent processing, are provided with the compensated timing measurement for such processing.

Of course, one of the several advantages of the teachings presented herein is the ability to perform at least some aspects of the present invention in a variety of node types. Thus, to the extent that the node that determines a compensated timing measurement is not the node that actually uses that compensated timing measurement in positioning, timing correction, or other targeted process, the node may "provide" the compensated timing measurement to another node, directly or indirectly. For example, a user equipment might determine the compensated timing measurement and provide it to a base station, or to a positioning node. As another example, a base station may determine she compensated timing measurement and then provide it to a user equipment and/or to a positioning node.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
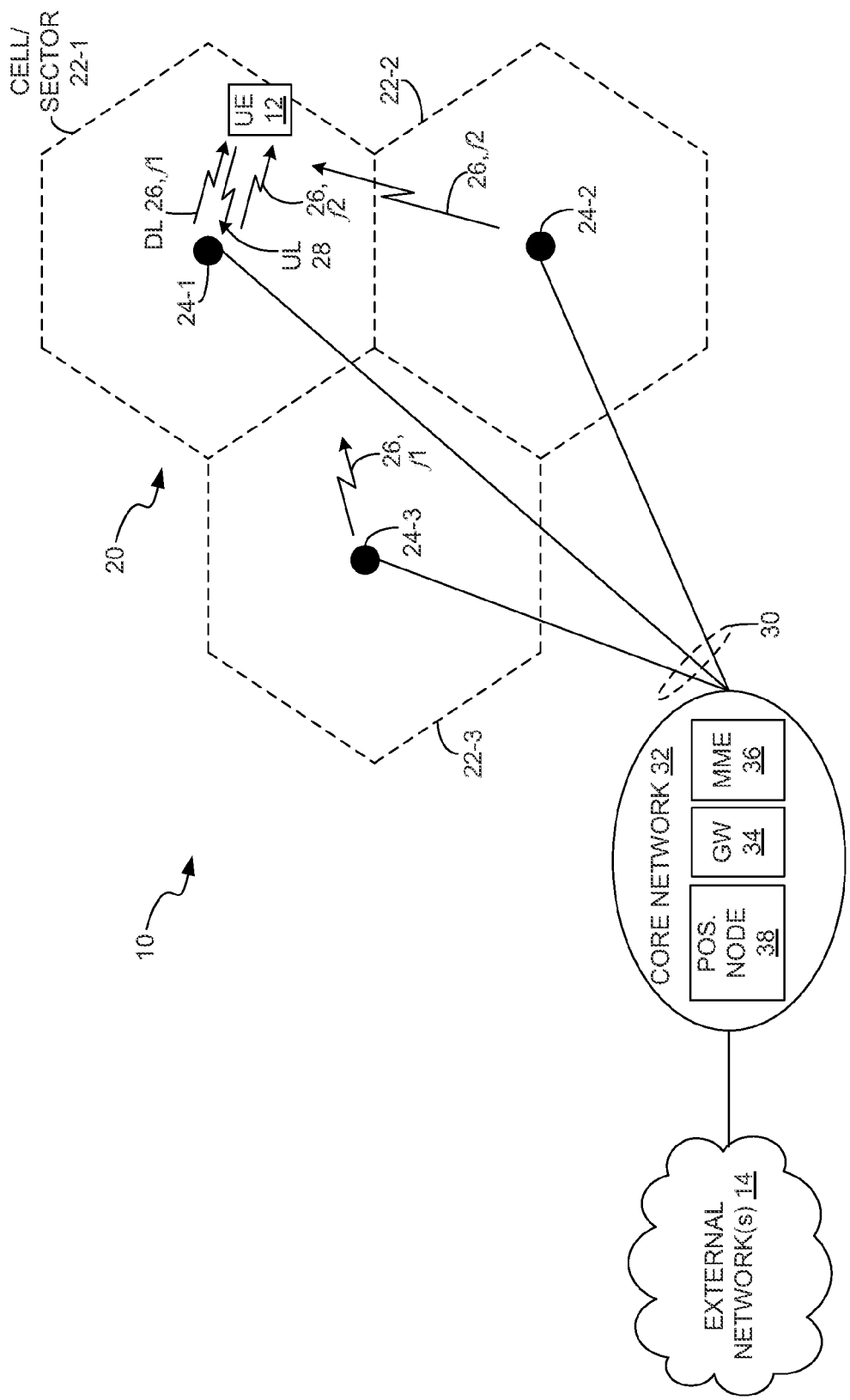
FIG. 1 is a block diagram of an example embodiment of a wireless communication network 10, where one or more of illustrated nodes (user equipment, base station, positioning node) are configured to calculate and/or use radio signal timing measurements that are compensated according to the teachings herein.

FIG. 1 illustrates an example wireless communication network 10 ("network 10"). By way of non-limiting example, the illustrated network 10 comprises a cellular communication network or other Public Land Mobile Network (PLMN). As a more specific but still non-limiting example, the network 10 is configured according to the Long Term Evolution (LTE) standards, as promulgated by the Third Generation Partnership Project (3GPP). In another example, the network may operate more than one Radio Access Technology (RAT) and may also comprise radio network nodes that support more than one RAT, e.g., Multi-Standard Radio (MSR) nodes.

In operation, the network 10 communicatively couples items of user equipment 12 to each other and/or to devices or systems in one or more external networks 14. As an example, a given item of user equipment 12 comprises a cellular radio telephone, e.g., a smart phone with a web client, and the network 10 communicatively couples the smart phone to an external web server for email, browsing, etc. By convention herein, the term "user equipment" is shortened to "UE," where "UE 12" refers to a single item of user equipment, and "UEs 12" refer to more than one item of user equipment, e.g., multiple phones or other wireless communication devices. Broadly, the term can be understood as referring to any device receiving downlink signals from the network and/or transmitting uplink signals to the network, and as such may also be a relay or radio node equipped with a downlink radio interface and/or uplink radio interface, such as a femto base station.

Continuing with an overall description of FIG. 1, one sees that the network 10 includes a Radio Access Network (RAN) 20 that is arranged as an number of potentially overlapping cells or sectors 22, which are referred to as "cells 22" for simplicity herein. As a non-limiting example, each cell 22 is associated with or otherwise served by a base station 24. It should be noted, however, that the present invention is not limited to the illustrated arrangement and is directly applicable, for example, to arrangements in which one base station 24 serves multiple cells 22, which may belong to the same or different RATs. Further, a base station 24, at least in some embodiments, may be understood as a more general radio node which may be a relay node, a repeater, a measurement unit (e.g., LMU), etc.

It will also be understood that only one UE 12 is illustrated for simplicity, but each cell 22 may be serving a potentially large number of UEs 12. However, it is noted that one or more embodiments of the present invention also apply when cell 22 is not necessarily the serving or primary cell of the UE 12, such as when a timing measurement is performed with respect to a non-serving or non-primary cell.

Still further, it should be understood that generic node names are used in an introductory sense here, so that the reader does not mistakenly infer that certain radio or network technologies are being implied or excluded. The present invention has applicability to a range of radio network types, including, by way of example, LTE. In an LTE context, the base stations 24 would be configured as LTE "eNodeBs."

In the illustration, ones sees three example base stations 24, individually distinguished using the numeric suffixes "-1," "-2," and "-3." With such numbering, "base station 24" is singular and "base stations 24" is plural, and suffixes are used when needed for clarity in distinguishing one base station 24 from another base station 24, e.g., "24-1" versus "24-2." The same approach is used for the cells 22.

Each base station 24 transmits to the UEs 12 that it supports using one or more downlink signals 26. The base station 24-1 transmits downlink signals 26 on two distinct downlink carrier frequencies, which may belong to different frequency bands, f1 and f2. The downlink signals 26 from the base station 24-2 are transmitted on one downlink carrier frequency, f1, while the base station 24-3 uses the downlink carrier frequency f2. In turn, each UE 12 transmits at least to its serving base station 24 one or more uplink signals 28. The uplink carrier frequency band(s) used by given UEs 12 may be different than the downlink frequency bands on which their respective serving base stations 24 serve them.

Now, as explained in the Background section, it is common in networks 10 for base stations 24 and/or UEs 12 to make radio signal measurements, including, for example, timing-related measurements. In a positioning-related example, a cell 22 may be designated as a "reference" cell 22 for a given UE 12, and the UE 12 may measure propagation time differences between the downlink signals 26 from one or more additional cells 22. For a given radio channel (propagation) environment, different frequencies will experience more or less dispersion. One of the advantages of the teachings herein is compensating timing measurements that involve relative timing between signals at different frequencies, for the effects of signal frequency differences on signal propagation times.

With that point in mind, the present invention comprises a node configured for operation in a wireless communication network having multiple carriers operating at different carrier frequencies. Here, the "node" may be a UE 12, a base station 24, or another node in the network 10. For example, the network 10 as illustrated in FIG. 1 includes a core network 32 that includes a number of nodes, such as a serving gateway (GW) 34, a mobility management entity (MME) 36, and a positioning node 38. While the positioning node 38 generally does not include a radio communication interface, it does include interface circuitry and protocol processing enabling it to "talk" to base stations 24 and/or to UEs 12. As such, in at least one embodiment herein, the node of interest is the positioning node 38, which receives (uncompensated) radio signal timing measurements from a base station 24 and/or a UE 12, and compensates them as taught herein. In another embodiment, uncompensated radio signal measurements may be received by a radio network node, e.g., eNodeB or radio measurement unit such as LMU, which then compensates the measurements as taught herein.

Continuing with details for the example node (12, 24, or 38), it comprises a communication interface configured for communicating with one or more other nodes within the network 10. The node further includes one or more processing circuits configured to obtain a timing measurement performed over first and second radio signals at first and second carrier frequencies, respectively. Here, the node may "obtain" the timing measurement based on the node making the requisite signal measurements—e.g., measuring arrival time differences between a reference cell's downlink signal 26, which is transmitted according to a first carrier frequency, and the downlink signals 26 from one or more other cells 22, where the other cells' downlink signals 26 may be transmitted at a second (or second and third) carrier frequencies. However, in another embodiment, the node is not the node that makes the raw timing measurements, in which case, an example of "obtaining" the timing measurement for compensation is receiving the timing measurement from another node in the network 10.

In any case, the node is configured to determine whether timing compensation is needed for the timing measurement based at least in part on the frequency distance between the first and second carrier frequencies. When timing compensation is needed, the one or more processing circuits of the node is/are configured to compensate the timing measurement using a compensation value that compensates the timing measurement for frequency-dependent propagation differences between the first and second carrier frequencies. The node is further configured to provide the compensated timing measurement for use in processing dependent on said timing measurement—meaning that the node provides the compensated value internally or its own timing-dependent processing and/or the node sends the compensated value to another node for such processing.

Figure 2:
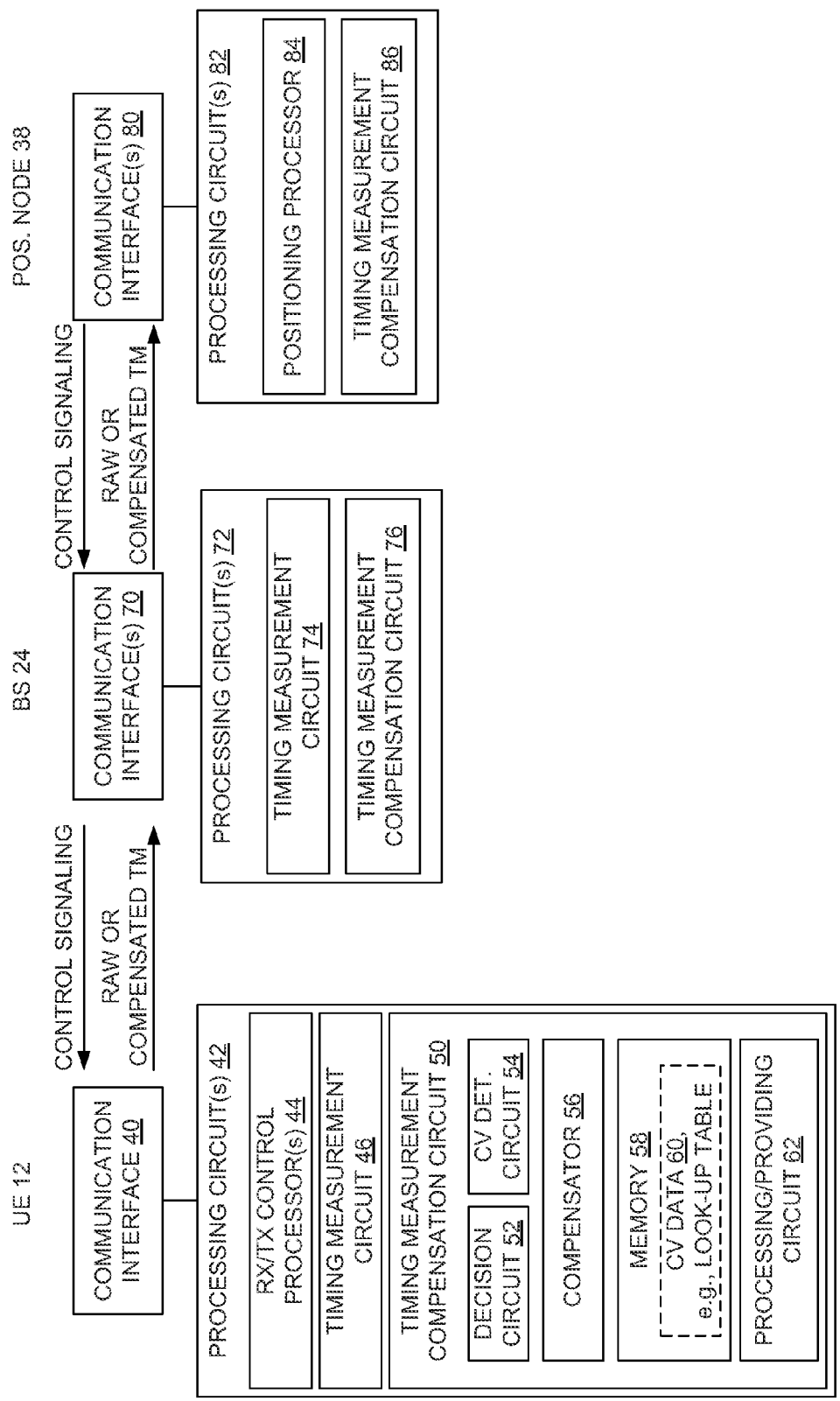
FIG. 2 is a block diagram of example embodiments of the various nodes introduced in FIG. 1, including example node circuitry that is configured to carry out timing measurement compensation.

FIG. 2 illustrates that the UE 12, the base station 24, and the positioning node 38, each can be configured as the above-described node. Indeed, any or all of them may have such capability. In one embodiment, one or more of the UEs 12 are configured to operate as the above-described node. That is, in at least one embodiment, a UE 12 includes a communication interface 40, which may be a radio frequency cellular communication transceiver, and associated processing circuits 42, which may at least functionally include receive/transmit (RX/TX) control processors 44 (sometimes referred to as baseband processors or modem processors), a timing measurement circuit 46, and a timing compensation circuit 50.

In an example architecture, the timing compensation circuit 50 is at least functionally arranged as comprising a decision circuit 52, a compensation value (CV) determination circuit 54, a compensator 56, a memory 58 that includes timing measurement compensation values and/or configuration information used to determine such compensation values. The timing compensation circuit 50 further includes a processing and/or providing circuit 62 (abbreviated as "processing/providing"). This circuit either uses the compensated timing measurement in one or more calculations that conventionally would have used the uncompensated timing measurement, or it provides the compensated timing measurement to another node, e.g., by providing it to the RX/TX control processors 44, for transmission via the communication interface 40.

Those skilled in the art will appreciate that a UE 12 can be implemented using a mix of discrete and integrated circuitry, and that an integrated circuit may comprise fixed or programmable hardware circuits. Accordingly, it will be understood that the processing circuits 42 of the UE 12 are implemented in fixed hardware, or programmable hardware, or a mix of both. For example, certain signal processing operations associated with initial radio signal processing may be implemented in dedicated, high-speed circuitry, while other aspects of operation of the processing circuits 42 are implemented based on the execution of computer program instructions stored in the memory 58, or in another memory or computer-readable medium included in the UE 12.

In this regard, in one example, the processing circuits 42 include one or more microprocessors, microcontrollers, DSPs, or other digital processing circuitry, that takes on a particular circuit configuration according to the execution of one or more stored computer programs. In at least one embodiment, all or part of the timing compensation circuit 50 is implemented in programmable hardware according to computer program instructions.

While base stations generally are much more complex than UEs 12, similar observations apply. In the illustration, the example base station 24 comprises one or more communication interfaces 70, and any number of processing circuits 72 (which, for example, may be implemented in a rack/card/backplane arrangement). However implemented, these processing circuits 72 include timing measurement circuits, such as for time-of-arrival (TOA), time-difference-of-arrival (TDOA), RTT, Timing Advance, UE Rx-Tx, eNodeB Rx-Tx, propagation delay and other such radio signal timing measurements. The base station 24 also includes a timing measurement compensation circuit 76, as an addition to the timing measurement compensation circuit 50 in the UE 12, or as an alternative to including that UE circuit. The compensation may also be implemented in another network node, e.g., a positioning node, a radio network controller, etc., which receive the uncompensated measurements.

As with the UE 12, the base station's processing circuits 72 may be implemented in fixed and/or programmable hardware, although the base station 24 as a rule will include significantly more processing capability than the UE 12. Such processing capability is used to serve multiple UEs 12 on the radio side of the base station 24, and to support and interact with other nodes in the network 10 on the network side of the base station 24. In this regard, the communication interface(s) 70 can be understood in an example embodiment as including radiofrequency cellular communication transceivers, for sending downlink signals 26 and receiving uplink signals 28, to and from potentially many UEs 12.

The communication interface(s) 70 further include network-side communication interfaces, which are to be understood as wired or wireless connections and associated protocol processing and timing resources within the base station 24. In an example, the communication interface(s) 70 include an interface supporting communications with a processing node 38. Such interfaces are generally known in the network art.

Thus, the base station's timing measurement compensation circuit 76 can be implemented in addition to, or as an alternative to, implementing the UE's timing measurement compensation circuit 50. Similar options apply to the positioning node 38, which in the illustrated example includes one or more communication interfaces 80 and processing circuits 82. These circuits 82 at least functionally include a positioning processor 84, which is configured to perform and/or control positioning operations by, e.g., the base station 24 and/or the UE 12. Further, in at least one embodiment, the processing circuits 82 include a timing measurement compensation circuit 86, which can be in addition to, or an alternative to, the timing measurement compensation circuit 76 in the base station 24 and/or the timing measurement compensation circuit 50 in the UE 12.

With these possibilities, the above-introduced node may be any one of the UE 12, the base station 24, or the positioning node 38, and is thus referred to as "the node (12, 24, 38)," meaning any one of the UE 12, the base station 24, or the positioning node 38. Similarly, the node's processing circuits as configured for timing measurement compensation are referred to as "processing circuits (50, 76, 86)," where such notation does not mean all such circuits across multiple nodes, but rather any one of the processing circuits 50, processing circuits 76, or processing circuits 86. Thus, the node in question is UE 12 with timing measurement compensation circuit 50, the base station 24 with tuning measurement compensation circuit 76 or the positioning node 38 with timing measurement compensation circuit 76.

In at least one embodiment of the node (12, 24, 38), a reference carrier frequency is pre-determined or decided prior to the compensation and the node (12, 24, 38) is configured to apply the (timing measurement) compensation with respect to the reference carrier frequency.

Additionally, in at least one embodiment, the node's one or more processing circuits (50, 76, 86) are configured to determine whether timing compensation is needed for a timing measurement made for first and second radio signals, based on at least one of: (1) identifying a pair of radio carriers with which the first and second radio signals are respectively associated, and determining whether timing compensation is indicated for the identified pair; and (2) comparing the frequency distance to one or more defined frequency distance thresholds or ranges that determine whether timing compensation is needed. As an example, the node (12, 24, 38) includes a look-up table or other data structure stored in memory (e.g., as configuration data in non-volatile storage), where that table or other structure identities possible radio carriers and indicates for which pairings of those carriers timing compensation should be used.

Additionally, or alternatively, the table or other data structure includes one or more threshold values, which allow the node (12, 24, 38) to, for example, compute the frequency distance with the first and second carrier frequencies, and compare the result to the threshold, to see whether compensation should be performed. It is also contemplated that multiple timing measurement compensation values can be stored (or calculated), where the particular compensation value selected for using in compensating a given timing measurement is made to depend on the frequency distance between the radio signals underlying the timing measurements.

Thus, in at least one embodiment the one or more processing circuits (50, 76, 86) are configured to determine the (timing measurement) compensation value as a function of the frequency distance either by computing the compensation value according to an expression that depends on the frequency distance, or selecting, based on the frequency distance, a precomputed compensation value from among a plurality of precomputed compensation values.

In the same or another embodiment, the one or more processing circuits (50, 76, 86) are configured to determine whether timing compensation is needed for the timing measurement based on the frequency distance and further based on one or more parameters indicative of the propagation environment in which the timing measurement was made. As an example, the one or more parameters include at least one of: a velocity estimate associated with a node that made the timing measurement; the absolute value of the timing measurement or any indication of the distance between the measuring node, e.g., UE 12 performing downlink measurements, and the measured node, which is not necessarily the node associated with the serving cell, where the measured node is transmitting the radio signal measured by UE 12; and a radio environment value indicating or bearing on the time dispersiveness of the propagation environment in which the timing measurement was made.

With this approach, a timing measurement may be made on first and second radio signals from or to a UE 12 that is moving, and the decision on whether to compensate that measurement for carrier frequency differences between the first and second radio signals may be based at least in part on how quickly the UE 12 is moving. In another example, the decision may be based on the absolute value of the timing measurement or the distance indication, e.g., the compensation may apply when the distance indication indicates a distance between UE 12 and the measured radio node exceeds a certain threshold, and the amount of the compensation will then depend at least on the carrier frequency difference with respect to the reference frequency but may also additionally depend on the distance.

In at least one embodiment, the UE 12 is configured as a node that applies timing compensation, at least when needed according to the disclosed decision logic. Here, the one or more processing circuits 50 of the UE 12 are configured to determine the timing measurement as at least one of: a received signal timing difference between the first and second radio signals; a receive/transmit signal timing difference involving the first and second radio signals; a round-trip-time measurement determined from the first and second radio signals; a one way propagation delay determined from the first and second radio carriers or timing advance determined from the first and second radio signals.

Further, in such a UE embodiment, the communication interface 40 comprises a wireless communication interface and the UE 12 is configured to receive, via the communication interface, signaling indicating the compensation value to use for compensating the timing measurement, and further wherein the one or more processing circuits 50 of the UE 12 are configured to use the signaled compensation value for compensating the timing measurement. One advantage to such an embodiment is that the UE 12 applies the timing compensation, but the network 10, e.g., the base station 24 and/or the positioning node 38, signals the value(s) to be used by the UE 12 for compensating timing measurements. This approach allows the network 10 to be provisioned, for example, with compensation values that are tailored for its known or characterized radio environment(s).

In at least one such embodiment, the signaling comprises Radio Resource Control (RRC) signaling from a base station 24 in the network 10, or comprises positioning protocol signaling from a positioning node 38 in the network 10. See, for example, the 3GPP technical specification TS 36.355 for LTE Positioning Protocol (LPP) details, covering positioning-related signaling between a UE 12 and an Enhanced Serving Mobile Location Center (E-SMLC). Correspondingly, the UE 12 is configured to implement at least one of a RRC protocol for processing radio resource control protocol signaling and a positioning protocol for processing positioning protocol signaling.

Of course, as earlier noted, the UE 12 may make or be involved in timing measurements that require compensation, but it is not necessarily the node that performs the compensation. In one or more embodiments, the node that performs timing compensation is the base station 24 or the positioning node 38, either of which are configured to receive the timing measurement to be compensated from another node in the wireless communication network, via the communication interface of the node. As one example, the base station 24 receives a timing measurement from the UE 12 in raw, uncompensated form, where that value is received via the cellular radio portion of the base station's communication interfaces 70, and the base station 24 applies compensation if it decides that such compensation is needed.

In another embodiment, the positioning node 38 receives a raw, uncompensated timing measurement and applies compensation if it decides that such compensation is needed. In one LTE example of this approach, the positioning node 38 is an E-SMLC and it receives the timing measurement to be compensated from a base station 24 via LPPa-based signaling between it and the base station 24. Now, the base station 24 may have made the timing measurement itself, or it may have received from a UE 12, such as through RRC-based signaling between the UE 12 and the base station 24.

In a similar embodiment, the timing measurement to be compensated still flows to the positioning node 38 through the base station 24, but that is a pass-through operation in the sense that the positioning node 38 is an E-SMLC and communicates with a UE 12 via LPP-based signaling. This approach allows, for example, the UE 12 to make timing measurements and send them in uncompensated form to the positioning node 38, thereby allowing the positioning node 38 to decide whether compensation is needed, and, if so, to apply the appropriate compensation value. Alternatively, the positioning node 38 can use its LPP-based signaling link to the UE 12 to provide one or more timing compensation values to the UE 12, thereby allowing the network to provide the UE 12 with appropriate timing compensation values for use in UE-performed timing compensation.

In general, then, the node (12, 24, 38) that is configured to apply timing compensation may receive the timing measurement to be compensated from another node in the network 10, or it may compute/estimate that value itself, and it may receive the compensation values(s) to use for compensating such measurements from the same other node, or yet another node in the network 10. As an example, the base station 24 receives uncompensated timing measurements from the UE 12 and receives the compensation value(s) to use for compensating such measurements from the positioning node 38. In another permutation, the base stations 24 are provisioned with the compensation value(s) to use, which is advantageous because much of the relevant radio network configuration information is already known at the base stations 24, and the base stations 24 are configured to provide such values to the positioning node 38 and/or the UEs 12.

Regardless, in at least one embodiment, the one or more processing circuits (50, 76, 86) that perform timing measurement compensation are configured to determine whether compensation is needed based not only on the frequency distance at issue, but further on an accuracy requirement for the timing measurement. In such an embodiment, timing compensation is or is not applied for a given frequency distance in dependence on the accuracy requirement applicable to the timing measurement or applicable to a calculation dependent on the timing measurement. This approach is advantageous in that it allows a more sophisticated determination of whether timing compensation should be performed.

In a positioning-related context, an example is where a UE 12 measures arrival time differences between downlink radio signals 26 from different cells 22, where those signals are sent on different carrier frequencies. Such signals have a known or determinable frequency distance between them. Now, the processing circuits (50, 76, 86) may use an approach where the accuracy requirement "gates" the timing compensation process altogether, e.g., regardless of frequency distance, no compensation is performed if a lowest accuracy requirement is known or indicated for the timing measurement or for the positioning measurement that depends on the timing measurement. (The accuracy requirement may be based on the positioning Quality of Service (QoS) parameters associated with the positioning session or positioning measurement request. This may in turn be predefined or pre-configured e.g. in relation to the measurement type or the positioning method, or may be known from indicators in the positioning-related signaling).

In a non-limiting example, the compensation may be decided based on the criticality of the positioning request or service. For example if positioning is associated with an emergency call or specific application involving safety then tighter measurement accuracy is generally required. Hence in this example compensation should be applied. In general the compensation may be applied for positioning methods, which are expected to provide more accurate positioning as they are typically used for more critical services. Examples of relatively more accurate positioning methods are OTDOA, AECID, UTDOA etc. On the other hand compensation may not be necessary for measurements which are related to less accurate positioning methods e.g., E-CID.

In an alternative, the same value of frequency distance will or will not trigger timing compensation in dependence on the accuracy requirement. Thus, a given size or magnitude of frequency distance triggers timing compensation if the accuracy requirement is "high" (assuming, for example, a low/medium/high universe of possible accuracy requirement values), but the same value of frequency distance does not trigger timing compensation if the accuracy requirement is low. More broadly, the decision as to whether timing compensation is or is not used is in one or more embodiments extended to consider at least one of: (1) a parameter indicating the type of propagation environment in which the timing measurement was determined, and (2) an accuracy requirement associated with the timing measurement.

Also, as noted, the node that applies the timing compensation to obtain the compensated timing value may or may not be the node that uses the compensated value in subsequent processing that uses the compensated timing value. In one embodiment of the node (12, 24, 38), the one or more processing circuits (50, 76, 86) comprise a timing measurement compensation circuit that is configured to apply the compensation value to the timing measurement, thereby obtaining the compensated timing measurement.

More broadly, the one or more processing circuits (50, 76, 86) are configured to provide the compensated timing measurement for use in processing dependent on said timing measurement based on one of: (1) providing the compensated timing measurement to a local processing circuit within the node (12, 24, 38), for use by the local processing circuit in carrying out the processing dependent on the compensated timing measurement; or (2) providing the compensated timing measurement for transmission from a communication interface (40, 70, 80) of the node (12, 24, 38), for sending the compensated timing measurement to another node that performs processing dependent on the compensated timing measurement.

Figure 3:
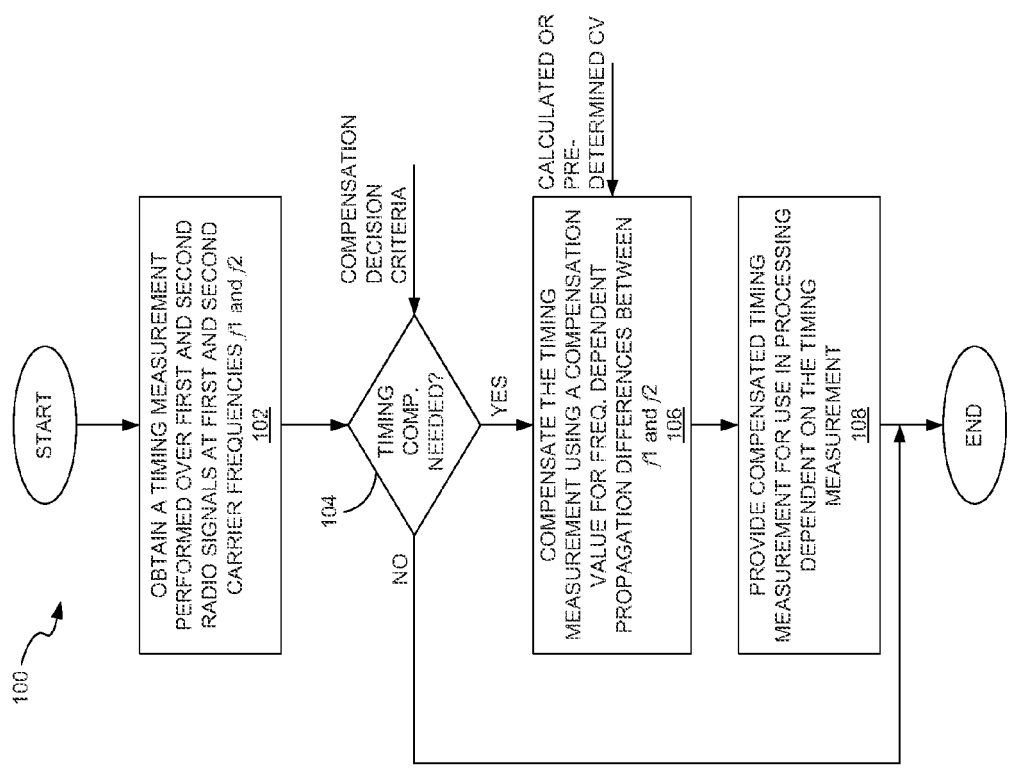
FIG. 3 is a logic flow diagram of one embodiment of a method for compensating radio signal timing measurements, where the illustrated method is implemented in a node of a wireless communication network.

FIG. 3 illustrates a method of compensating a timing measurement, and represents a non-limiting example of an algorithm that is implemented by the processing circuits 50 in the UE 12, the processing circuits 76 in the base station 24, or the processing circuits 86 in the positioning node 38. It will be appreciated that such circuitry in one or more embodiments is configured at least in part based on digital processing circuitry executing computer program instructions that cause such processing circuitry to take on the functional circuit arrangements illustrated in FIG. 2, for example.

It will further be appreciated that the logic flow diagram of FIG. 3 may be carried out as part of a larger set of processing operations, may be repeated or looped as needed, and may be executed in parallel or as needed, for any number of timing measurement compensations. Also, unless otherwise required or stipulated, the order of processing presented in the illustration serves as a non-limiting example, and one or more of the various processing steps could be carried out in another order, in parallel, etc.

With the above qualifications in mind, the method 100 of FIG. 3 compensates timing measurements made in a network 10 having multiple carriers operating at different carrier frequencies. The method 100 is implemented in a node (12, 24, 38) that is configured for operation in such a network 10, and it comprises obtaining a timing measurement performed over first and second radio signals at first and second carrier frequencies respectively (Block 102), and determining whether timing compensation is needed for the timing measurement based at least in part on the frequency distance between the first and second carrier frequencies (Block 104). That decision is informed by, for example, any number of compensation decision criteria which include by way of non-limiting example any one or more of: (1) propagation environment information, which is useful in that some environment types are more dispersive than other and therefore exacerbate propagation differences between higher and lower frequencies; (2) accuracy requirements for the timing measurement or a dependent measurement; and (3) mobility values, e.g., rate of travel for a UE 12 that made or is associated with the timing measurement at issue.

When timing compensation is needed ("YES" from Block 104), the method 100 includes compensating the timing measurement using a compensation value that compensates the timing measurement for frequency-dependent propagation differences between the first and second carrier frequencies (Block 106), and providing the compensated timing measurement for use in processing dependent on said timing measurement (Block 108). The "NO" branch from Block 104 skips the timing compensation processing, i.e., leaves the timing measurement uncompensated.

In various refinements, variations, and extensions of the method 100, the processing that makes use of the compensated timing measurement includes measurement processing for position estimation of the node or another positioning target, which may be, e.g., another radio node within the network 10.

In at least one embodiment of the method 100, the first and second carrier frequencies belong to different frequency bands.

In at least one embodiment of the method 100, a reference carrier frequency is pre-determined or decided prior to the compensation and the compensation is applied with respect to the reference carrier frequency. For example, one of the radio signals involved in the timing measurement relates to a reference frequency, and the frequency differences (distances) are computed relative to the reference frequency.

In another embodiment of the method 100, the compensation value depends on the RAT or technologies used for measurements on the first carrier frequency and the second carrier frequency. Thus, one radio signal at issue in the timing measurement to be compensated may come from a RAN that uses one RAT and another one of the signals at issue in the timing measurement comes from a RAN using another RAT (or, effectively, it may be understood that a given RAN employs two or more RATs).

Taking the various embodiments in mind, it will be appreciated that one aspect of the present invention is applying compensation to a timing measurement, where the compensation depends on at least one of: timing measurement type, frequency channel, frequency band and RAT. In addition, the carrier bandwidths and measurement bandwidths on these carriers may also be taken into account. In this regard, the present invention includes a number of further aspects: methods for determination of frequency compensation to timing measurements, methods of applying the frequency compensation to timing measurements, and signaling arrangements to enable the frequency compensation and/or to exchange compensated timing measurements.

The embodiments apply for any timing measurement, including downlink timing measurements, uplink timing measurements or a timing measurement that involves measurements on both downlink and uplink radio signals such UE or BS Rx-Tx or RTT measurements.

In one specific example, the timing measurements are the timing measurements used for positioning. However, it should be appreciated that various embodiments are not limited to the currently standardized timing measurements, such as those provided in LTE. Frequency compensation as used herein thus may apply to inter-frequency intra-band, inter-band or inter-RAT measurements. The embodiments are applicable in general for systems capable of carrier aggregation and systems not capable of carrier aggregation.

The embodiments are also applicable in general for systems capable of multiple transmit/receive antennas (e.g. DL/UL MIMO, DL/UL closed loop transmit diversity, DL/UL open loop transmit diversity, DL/UL beamforming, etc.) and systems not capable of carrier aggregation. The embodiments are also applicable in general for systems capable of combined MIMO and carrier aggregation (CA) or partly capable of combined MIMO and CA (e.g. MIMO and CA only in DL) and systems not capable of combined MIMO and CA. Further, the embodiments of the present invention are not limited to LTE, and may have direct applicability to radio networks with a single RAN or multiple RANs, and single- or multi-RAT networks. Some other RAT examples in which the contemplated timing measurement compensations may be employed are LTE-Advanced, UMTS, GSM, cdma2000, WiMAX and WiFi.

Further, it should be understood that "UE" is a non-limiting term, which means any wireless device or node (e.g. PDA, laptop, mobile, sensor, fixed relay, mobile relay, a small base station, any device or node being positioned or a LCS target in general when timing measurements for positioning are considered).

Still further, the positioning node 38 as described in different embodiments is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC.

The signaling described for one or more embodiments of the present invention is either via direct links or logical links (e.g. via higher layer protocols and/or via one or more network nodes). For example, in LTE in the case of signaling between E-SMLC and LCS Client the positioning result may be transferred via multiple nodes (at least via MME and GMLC).

As for the compensation itself, the compensation values used to compensate timing measurements are defined in one embodiment as a relative compensation factor and in another embodiment as an absolute compensation offset used to update a timing measurement in order to compensate for an expected difference with respect to a reference measurement. The compensation factor and the offset are herein commonly referred to as compensation factor or compensation value, for the sake of simplicity without limiting the present invention.

The reference measurement may be the same type of measurement as if it were performed at least one of the parameters: a reference frequency channel, frequency carrier, frequency band, in a reference RAT. The reference may comprise parameters associated e.g. with at least one of: serving cell frequency or primary carrier (e.g. may be UE- and/or area-specific); any frequency carrier with the largest bandwidth; lowest frequency or frequency band used in the system (e.g. reference is 700 MHz assuming 700 MHz and 1900 MHz are used) or any suitable frequency which may not be used in the system; and pre-determined frequency band (e.g. 700 MHz).

The compensation may be defined for a single-direction measurement, e.g. time or arrival, and with respect to a reference frequency. For timing measurements that involve two directions (e.g. RTT or UE Rx-Tx) or more than one cells (e.g. RSTD), the compensation may be a composite of more than one compensation factor components. For example, a composite compensation for an RSTD measurement on carrier frequencies f1 and f2 may comprise the difference between two compensations with respect to a third reference frequency f3, one for each of the frequencies. In other words, in this case the timing compensation value shall preferably account for the difference between f1 and f3 and the difference between f2 and f3. A similar principle may apply to RTT or UE Rx-Tx measurements that involve DL and UL interfaces.

In a special case, f1 may be f1 or f2 may be f3, i.e. unlike in the previous example, the composite compensation VALUE will be determined by only one non-zero compensation. Consider another example of inter-band carrier aggregation (CA) with 2 DL component carriers (CCs) and 1 UL CC. Consider also that 1 DL CC is in the 700 MHz frequency band, 1 DL CC is in the 2100 MHz frequency band and the UL CC is in the 2100 MHz band. Assume also that the DL primary CC (PCC) is at 700 MHz. Therefore UE Rx-Tx time difference is to be measured by the UE between DL PCC on 700 MHz and UL CC on 2100 MHz. In an example embodiment herein, this magnitude of frequency distance would trigger the application of compensation to account for the frequency band difference.

In a similar example, a base station Rx-Tx time difference is to be measured by a base station 24 between a DL PCC on 700 MHz and an UL CC on 2100 MHz. Here, too, in at least one embodiment, this size of frequency distance would trigger the application of timing compensation to account for the frequency band difference.

In the above example, if the reference frequency is 700 MHz, the compensation is non-composite and comprises compensation only for the difference between 2100 MHz and 700 MHz (the compensation for 700 MHz being the reference frequency, chosen as the lowest frequency, is zero). The compensation may be composite if the reference frequency is not 700 MHz and not 2100 MHz. Thus, in one embodiment, the timing compensation is actually applied to the individual timing measurements involved. In at least one instance of this approach, the radio signal timing measurement for the reference frequency is not compensated, and then one or more of the other signals involved in the measurement are compensated according to their frequency distance from the reference frequency.

In one such example embodiment, the reference f3 for OTDOA RSTD is associated with the reference cell in the OTDOA assistance data. In another embodiment, the reference f3 is the serving cell frequency (e.g. DL primary carrier for OTDOA).

In any case, the compensation factors or values may be determined and maintained in internal or external memory of UE 12 or another node, such as the base station 24 or positioning node 38. Further examples of nodes which may provide compensation factors or values, or otherwise provide mapping information for timing measurement compensation include: LMU, Operations & Maintenance (O&M), Operations Support System (OSS), Self-Organizing Network (SON), relay node, donor relay node, Radio Network Controller (RNC), Base Station Controller (BSC), and essentially any other network controller, core network node, etc.). The compensation values may be stored or otherwise embodied as, for example: a table or a function e.g. which can be: a mapping function or an analytical function. Either may specify the relation between the compensation and at least one of: measurement type, frequency, frequency band, or RAT. The function may e.g. be an interpolation function taken over collected measurement statistics, where the statistics may be simulated or collected in a test bed or from a real network deployment.

The above table, mapping function, or analytical function can be pre-defined, e.g., loaded into the node at manufacture, or when provisioned, or can be provided via measurement or signaling when in operation.

Examples of a generalized function to derive a compensation value for compensating timing measurements for error to frequency difference between the signals involved in the measurements are:

$$\Delta\tau = F(f_{ref}, f_1). \quad (1)$$

Where $\Delta\tau$ is the required compensation factor for a timing measurement performed on frequency f1 to compensate for the frequency difference with respect to a reference frequency fref. An example of such a timing measurement is a time of arrival measurement on f1, where the compensation with respect to the frequency fref.

In another example, the compensation is determined as $$\Delta\tau = G(f_{ref}, f_1, f_2). \quad (2)$$

Where $\Delta\tau$ is the required compensation factor for a timing measurement performed over frequencies f1 and f2 to compensate for the frequency difference with respect to another frequency fref. An example of the timing measurement in this example may be an RSTD measurement between cell 22-1 on f1 and cell 22-3 on f2 (with momentary reference to the cells 22 of FIG. 1), and the compensation with respect to RSTD for the same cells but on frequency fref only.

In yet another example, the compensation is given as:

$$\Delta\tau = J(f_{ref}, f_1, f_2), \text{ where } f_{ref} = (f_{ref1}, f_{ref2}). \quad (3)$$

Where $\Delta\tau$ is the required compensation factor for a timing measurement performed over frequencies f1 and f2 to compensate for the frequency difference with respect to a frequency vector fref of two frequencies fref1 and fref2. An example of the timing measurement at issue in this example may be an RSTD measurement between cell 22-1 on f1 and cell 22-3 on f2, and the compensation with respect to the RSTD between the same cells but as if they were operating on frequencies fref1 and fref2.

In yet another example or extension, the compensation determinations given in Equations 1, 2, and 3 above may incorporate other parameters to account for other factors. For example, the compensation value determination may be based on $$\Delta\tau = P(fref, f1, \beta_1, \ldots \beta_m), \quad (4)$$

$$\Delta\tau = Q(fref, f1, f2, \beta_1, \ldots \beta_m) \quad (5)$$

$$\Delta\tau = R(fref, f1, \beta_1, \ldots \beta_m, \alpha_1, \ldots \alpha_m), \text{ and} \quad (6)$$

$$\Delta\tau = S(fref, f1, f2, \beta_1, \ldots \beta_m, \alpha_1, \ldots \alpha_m). \quad (7)$$

Where the parameters $\beta_1, \ldots \beta_m$ in Equations (4) and (5) may account e.g. for scaling factors. The parameters $\alpha_1, \ldots \alpha_m$ in Equations (6) and (7) may account for factors related to the radio environments e.g. channel quality, delay spread, scattering, fading rate and fading conditions, environment type (e.g. indoor and outdoor; or one of the environment types used in LPP such as badArea, notBadArea, mixedArea), etc.

As an example, the relation(s) for such factors may be obtained from simulations, test beds, drive tests, measurement statistics collected during the network operation (e.g. in the positioning node, eNodeBs, LMUs, O&M, SON) comprising on-line training, or off-line training (e.g. in a non-fully operational network but configured to request and collect specific measurements).

In at least one embodiment, the compensation mapping (e.g., determining compensation values from a table, mapping function, analytical function, etc.) may be area-specific, where in one example the area is a cell 22 or is otherwise the area served by a given base station 22. As such, the same frequency distance might result in the use of different frequency compensation values in one cell 22 versus another cell 22, or no compensation cell 22 and compensation in another cell 22.

In another embodiment, the compensation due to the frequency difference may also depend upon the radio environment. For example the timing error due to frequency differences may be larger in a radio environment that causes more scattering of the radio signals, such as indoor or urban environments. Thus, the mapping table used for applying compensation, or the function or expression used for calculating the compensation may depend upon the radio environment, which may be indicated, for example, using a bit, flag, or other indicator included in signaling.

A correction factor may also be applied, as explained in later sections, e.g. for the measurement quality. Such a correction factor may be viewed as one of the β-parameters in the example equations above. As an example of determining the required timing error compensation due to frequency difference, a node such as a base station 24 measures two sets of propagation delays from the same UE 12, e.g.: propagation delay (D111) from a UE 12 on a first frequency f1, for a first geographic location; and the propagation delay (D112) from the UE 12 at the same location for frequency f2. In a related example, the network can request the UE 2 to do the above measurements (i.e. propagation delays on f1 and f2) to derive the timing error compensation.

Regardless, assume that f1 is the reference frequency for this working example. The compensation factor to compensate the timing error when the timing measurement is done on signals on cells 22 operating on frequencies f1 and f2 thus will be (D111-D112). In this way the network 10 can build a mapping table for timing measurement compensation for different sets of carrier frequencies. It can also determine different versions of such a mapping table for different radio environments. Furthermore the mapping table(s) can be generalized to a wrapping function or a mapping expression. The compensation value expression can also be pre-defined and coded or otherwise programmed into the node(s) as needed.

In yet another embodiment, the compensation may also be a function of the timing measurement quality, e.g. a smaller compensation when the quality is not so good, to prevent increasing the uncertainty of the result. Alternatively, the compensation may be corrected with a scaling factor or another offset which depends on the timing measurement quality. An additional correction factor to the compensation may also be applied or otherwise incorporated into the compensation, depending on the measurement bandwidth. A correction factor may be represented by any one of the β-parameters in the foregoing equations.

Further, while one or more embodiments disclosed herein provide for the compensation value being determined and applied in the same node that made the timing measurement to be compensated, other embodiments are also considered. A possible example of such a scenario is when the compensation value is mapped in the positioning node 38, which can then be signaled to the UE 12, e.g. via LPP or LPPe (with the latter, e.g. operator or vendor-specific assistance data may also be provided which may be exploited, e.g. to better assist UEs 12 in RSTD measurements with the assistance data provided by the positioning node 38).

Applying RAT-specific compensation is particularly useful for co-located cells, where in one embodiment the co-located cells are associated with multi-standard base station. In this case, collecting the statistics and determining the relation between the compensation, especially inter-RAT, is easier. More particularly, co-located cells may be understood as all or the same coverage area being served using more than one carrier frequency (e.g., a UE 12 may be served and supporting on one or another set of downlink/uplink frequency bands, within the same coverage area).

The compensation may be applied prior to reporting the measurement either in the UE 12 or in a radio node (e.g. in the case of UL time difference measurements this may be an eNodeB or LMU, or it may be eNodeB for eNodeB Rx-Tx measurements). Furthermore, some timing measurements may be reported first to a radio node (e.g., via RRC) and then further to a network node (e.g., positioning node 38), where in this case the compensation may also be applied in the intermediate node (e.g., eNodeB in the example).

In another embodiment, the compensation may be applied in a network node after receiving the measurement from the measuring device/node. For example, the positioning node may apply the compensation to the measurements received from the UE or base station prior to using the measurement for updating a fingerprinting database or before calculating the position. In one embodiment, the fingerprinting database is used for AECID positioning method.

Yet in another embodiment when testing the positioning measurement requirements for the device under tests the compensation can be applied in test equipment (TE) or system simulator (SS). The TE or SS is used for the testing of devices under tests, such as a UE 12 or a base station 24, or a positioning; node 38 or LMU, etc.

In general, for a given timing measurement, compensation should not be applied multiple times, e.g. by both UE 12 and another node. Hence a rule can also be pre-defined to specify the node/device that shall apply compensation, and/or the nodes/devices which shall not apply compensation. Different rules may be used for different types of measurements, or as a function of the nodes involved in the measurement. In general, however, the use of such rules prevents confusion as to which node shall apply compensation. According to one specific example of a pre-defined rule, the compensation may be applied by the UE 12 but not by the base station 24, or by the positioning node 38.

The pre-defined rule(s) may also specify the reference frequency, and such rules may be enforced by setting appropriate requirements or defining a test case. For example a test case to verify the above rule may require a UE 12 to measure RSTD over cells 22 that belong to different frequencies (i.e. with a large difference: 700 MHz and 2100 MHz). The reported RSTD can be compared with a reference value determined for the same carriers without any compensation. A UE 12 that does not apply compensation (or applies the wrong compensation) will fail such a test if the reported RSTD is significantly different than the reference RSTD.

Additionally, or alternatively, testing may be used for determining whether compensation has been applied or not. One way to implement such a determination is to test the UE 12 such that compensation is triggered and not triggered and then compare the results. The result may also be compared to the measurement on the reference frequency (e.g., this test would fail if the difference is large). Such an arrangement allows the determination of one or both conditions: (1) the compensation of a given timing measurement does not excessively change the underlying timing measurement or derived value and/or (2) the compensation of a given timing measurement or derived value does adjust it, at least within a permissible or expected range, as compared to the uncompensated (raw) timing measurement or derived value.

In one embodiment, a frequency compensation mechanism as taught herein is a part of a fingerprinting positioning method, AECID, implemented in the positioning node 38. For example, a new timing measurement involving one cell 22 may be tagged with the cell ID and/or frequency, but a compensation value may be dynamically applied when creating clusters of measurements according to a requested tag or a set of tags (e.g. when creating a cluster describing an area corresponding to a certain range of timing measurement values). Furthermore, timing measurements at least for co-located cells 22 are aggregated into a single cluster, and compensation may be applied to timing measurements on a non-reference frequency.

The compensation values or mapping to use for compensation may be exchanged between network nodes (e.g. O&M and positioning node) or radio nodes (e.g. eNodeB and LMU or 2 LMUs or 2 eNodeBs). A compensation value associated with a timing measurement type, frequency, frequency band, RAT or their combination, may be signaled to a UE 12 from a positioning node 38 (e.g., via LPP or LPPe) or a radio node (e.g., via RRC or the protocol between UE and LMU), or to a radio node (e.g., eNodeB or LMU) from the positioning node 38 (e.g. via LPPa), or to the positioning 38 from the radio node.

There may also be an indication associated with a timing measurement report (sent e.g. via LPP or LPPa or LPPe), indicating whether compensation has been applied. By use of such an indication, it becomes possible according to the present invention to ensure that frequency compensation is not applied multiple times to the same timing measurement, e.g. in the UE 12 and again in the positioning node 38. Such an approach allows timing compensation capabilities to be implemented in more than one node (e.g., processing circuits 50 in the UE 12, processing circuits 76 in the base station 24, and/or processing circuits 86 in the positioning node 38). For any given timing measurement, only one node applies the compensation, but the particular node that applies the compensation for a particular measurement or a particular time, can be varied to reduce signaling or otherwise increase data handling and/or computational efficiency, reduce delays, or improve accuracy, in any case, the supporting signaling contemplated herein may be user plane signaling, control plane signaling, or a mix of both (possibly at different times and for different types of measurements).

It is also contemplated in at least one embodiment to use signaling interfaces between network nodes for configuration of a compensation flapping table or for otherwise provisioning one node with compensation value(s) to be used for timing compensation. According to one such example, one node may configure another node with compensation values to be used by such other node. The node providing the compensation table, or the values to load into such a table, may acquire such values based on a measurement campaign—e.g., ongoing signal measurements or other operational observations—being conducted in the background. Examples of such nodes are SON, O&M, or OSS nodes, the positioning node 38, a Radio Network Controller (RNC) or Base Station Controller (BSC), or any controller or other entity within the core network 32 (e.g. the MME 36 or GW 34).

In one example, a SON node configures or otherwise provides the positioning node 38 with the latest mapping table for compensating errors between f1 and f2. The positioning node 38 then uses the updated table to compensate for timing error in timing measurements made between frequency f1 and frequency f2.

In another example, the SON configures or otherwise provides the latest mapping table to a base station 24 or other such radio node. The base station 24 then uses the updated table to compensate for timing errors in timing measurements made between frequency f1 and frequency f2.

One advantage of using another node to provide updated compensation values is that when new frequencies or frequency bands are deployed or the radio environment is changed or the reference frequency is changed the new set of lapping table can be signaled to the network node(s) that need the updated compensation values for performing the compensation.

As for what type or types of measurements are compensated according to the teachings herein, specific examples of timing measurements that are compensated (when needed) include one or more of: timing measurements used for OTDOA and UTDOA, or timing measurements used for Enhanced Cell ID (E-CID) or AECID, such as propagation delay, round trip time, UE Rx-Tx time difference, timing advance, eNodeB Rx-Tx, etc.

The present invention in its several embodiments provides a number of operating advantages, including enhanced positioning performance in multi-frequency and/or multi-RAT networks 10. In so doing, the present invention provides new measurement methodologies for implementation in any one or more of UEs 12, base stations 24, and positioning nodes 38, and further provides methods by which such nodes may be provided with updated compensation values to use for timing measurement compensation.

The compensation taught herein improves measurement reporting quality and in many instances allows the compensated timing measurement to meet measurement accuracy and reporting delay requirements that would not be met absent such compensation. Consequently, among other things, positioning can be performed more accurately in any network regardless of the frequency ranges used. Further, the ability to introduce new or modified compensation values appropriate for the radio configurations in use within the network 10 ensures that the timing compensation mechanisms within the network 10 remain appropriate as the network configuration changes.

Figure 4:
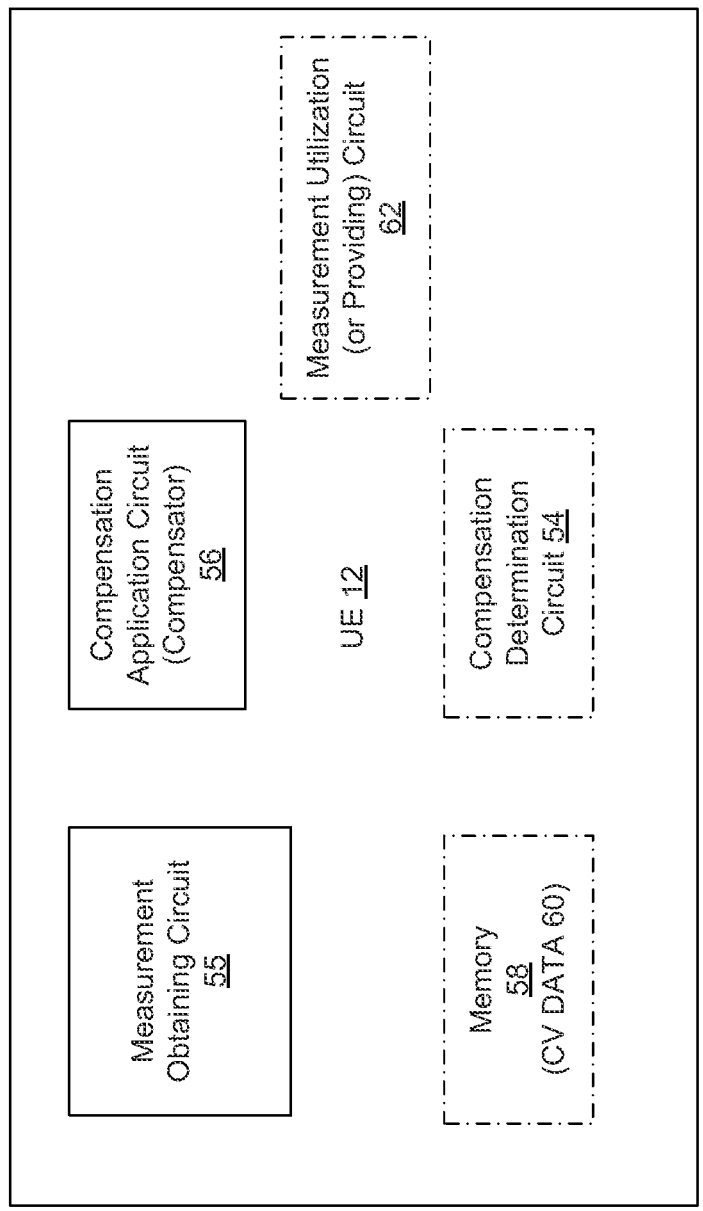
FIGS. 4-6 are block diagrams of further example embodiments of various nodes for use in a wireless communication network, where the illustrated nodes are configured to calculate and/or use compensated radio signal timing measurements.

As noted, such compensation mechanisms may be implemented in any number of locations within the network 10. FIG. 4, for example, illustrates another embodiment of the UE 12, such as may be used to provide E-based positioning capability. As shown in the diagram, the UE 12 includes a measurement obtaining circuit 55 configured to obtain one or more timing measurements at one or more frequencies, at least one of which is different than a reference frequency. The UE 12 further includes a compensation application circuit 56 configured to compensate one or more of those timing measurements based on that frequency difference.

The UE 12 may further include a compensation determination circuit 54 configured to determine one or more compensation values to apply to the one or more timing measurements as discussed above (e.g., by retrieving the values from a look-up table stored in memory). Finally, the UE 12 may also include (particularly for UE-based positioning approaches) a measurement utilization circuit 62 configured to utilize the compensated timing measurements, e.g., for determining the UE's position.

Figure 5:
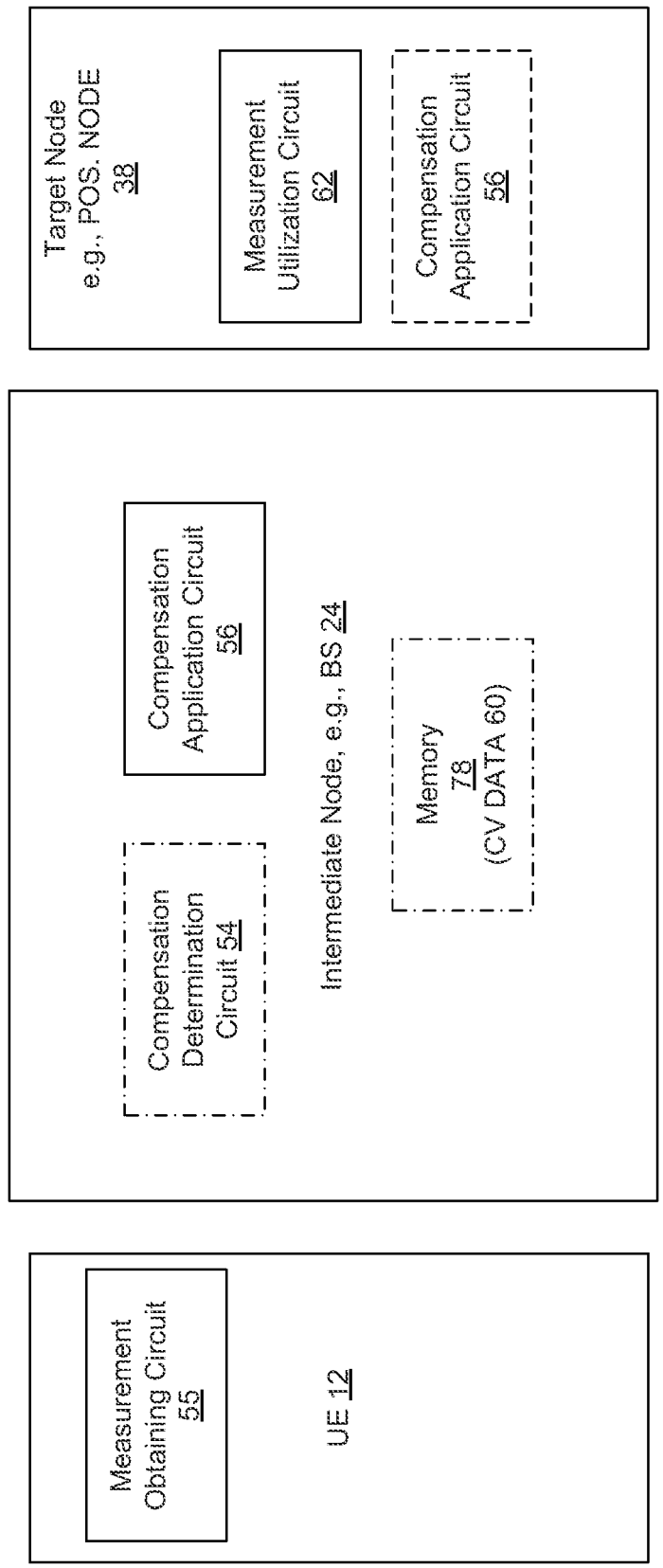

FIG. 5 illustrates a more distributed approach. As shown in FIG. 4, the UE 12 still includes a measurement obtaining circuit 55, but simply signals those measurements to an intermediate node, such as a node in the radio access node (e.g., a base station 24). The example base station 24 correspondingly includes the compensation application circuit 56, and optionally the compensation determination circuit 54, and a memory 78 which may hold compensation value (CV) data 60. Further, a target node (e.g., a positioning node 38) as the ultimate target for the compensated timing measurements includes the measurement utilization circuit 62, which makes one or more calculations in dependence on the compensated timing value.

Figure 6:
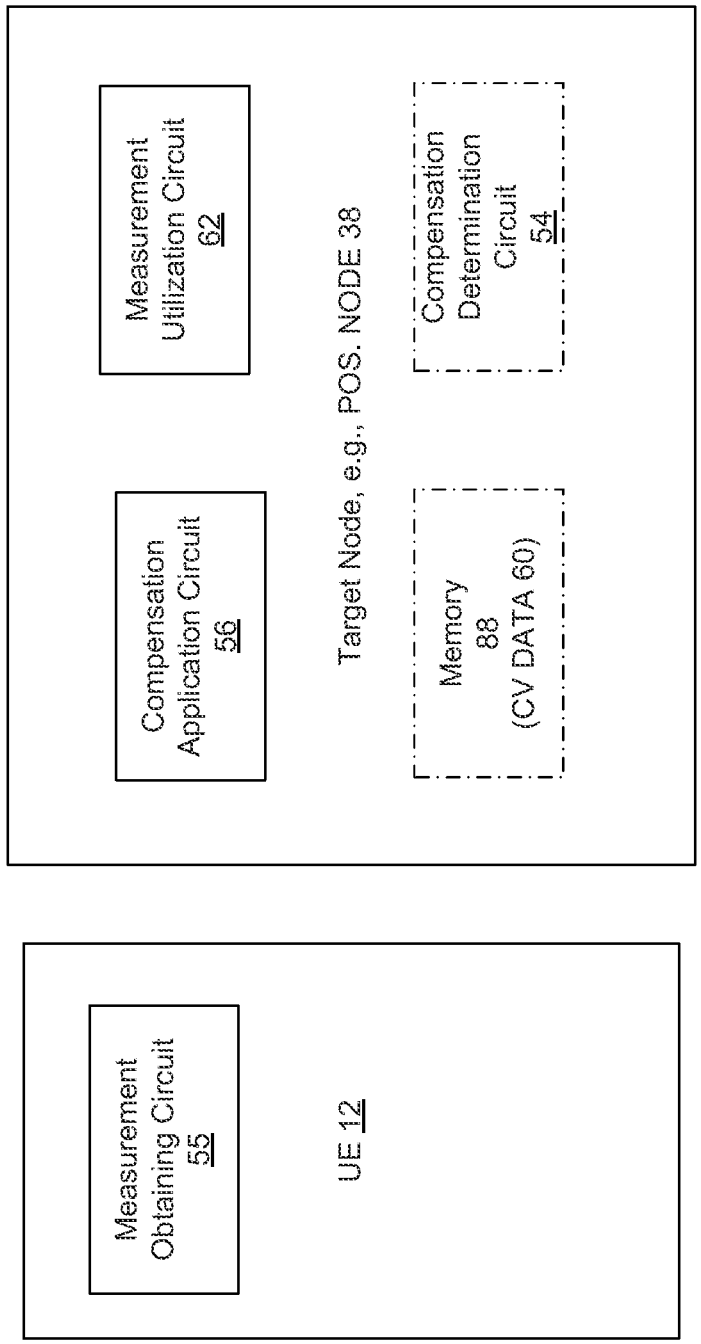

FIG. 6 illustrates a further example, where the UE 12 includes a measurement obtaining circuit 55, e.g., a circuit that makes the raw, uncompensated timing measurement. The uncompensated measurement is communicated to the positioning node 38, for example, which includes the compensation determination circuit 54, to determine the appropriate compensation value, the compensation application circuit 56, to apply the compensation value to the uncompensated measurement, and the measure ent utilization circuit 62, to make use of the compensated measurement. The positioning node 38 also may include a memory 88, for storing data, such as the CV data 60.

Figure 7:
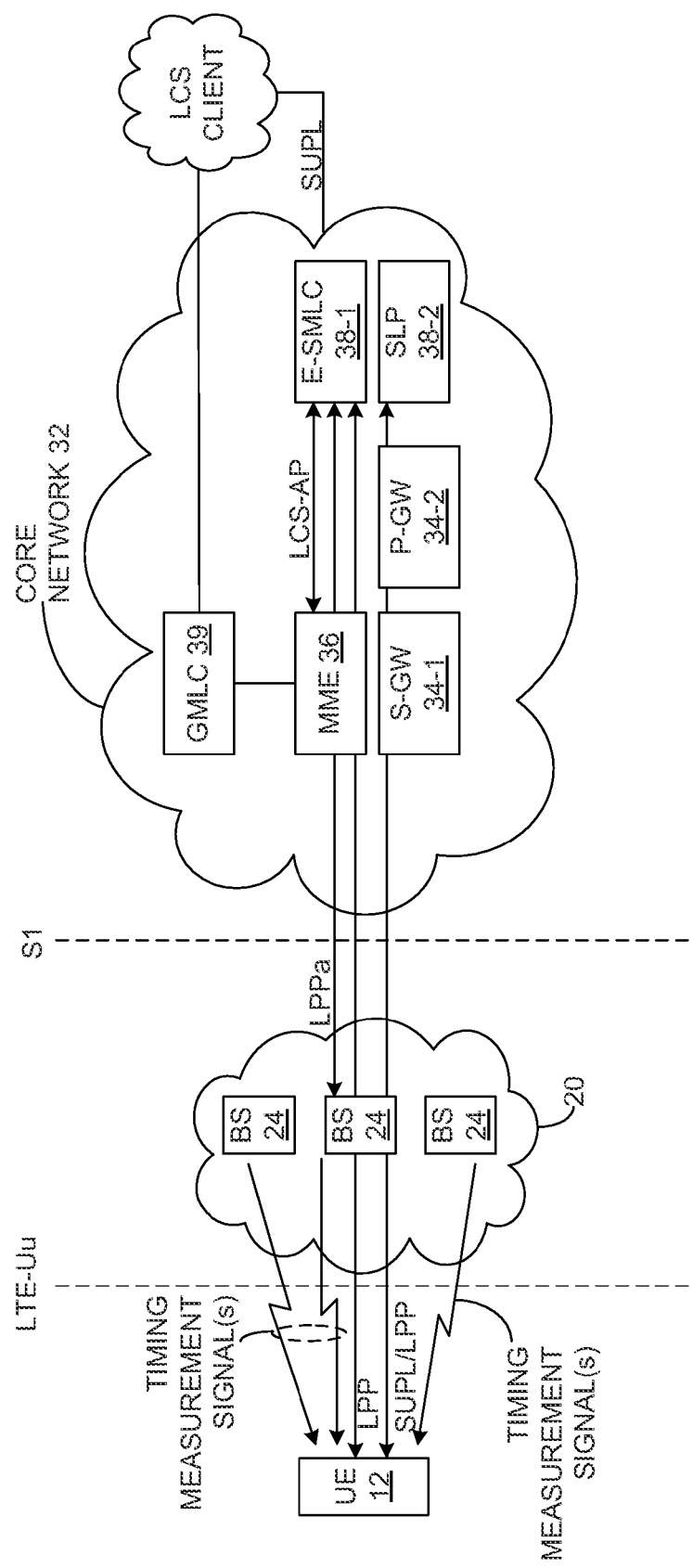
FIG. 7 is a block diagram of another example embodiment of a wireless communication network that includes one or more nodes configured to calculate and/or use radio signal timing measurements that are compensated according to the teachings herein.

FIG. 7 provides a further useful example, wherein the network 10 is shown by way of non-limiting example as an LTE network. The UE 12 communicates over an LTE-Uu interface, and the RAN 20 communicates with the core network 32 over an S1 interface. One sees LPPa-based communication links between the base stations 24 (here eNodeBs) and the positioning node 38, here represented as an E-SMLC 38-1 and/or SLP 38-2. One sees further core network details in terms of the GW 34 being represented as a serving GW 34-1 and a Packet GW 34-2. Still further, one sees that positioning-related measurements may be triggered by or provided to an external LCS client that communicatively couples to the SLP via a SUPL-based link and/or couples to a GMLC 39 within the core network 32. In an example case, the position determinations provided for LCS are improved because the underlying radio signal timing measurements are compensated for frequency differences between the signals involved in the measurements and/or for the difference between their frequencies and a reference frequency.

Figure 8:
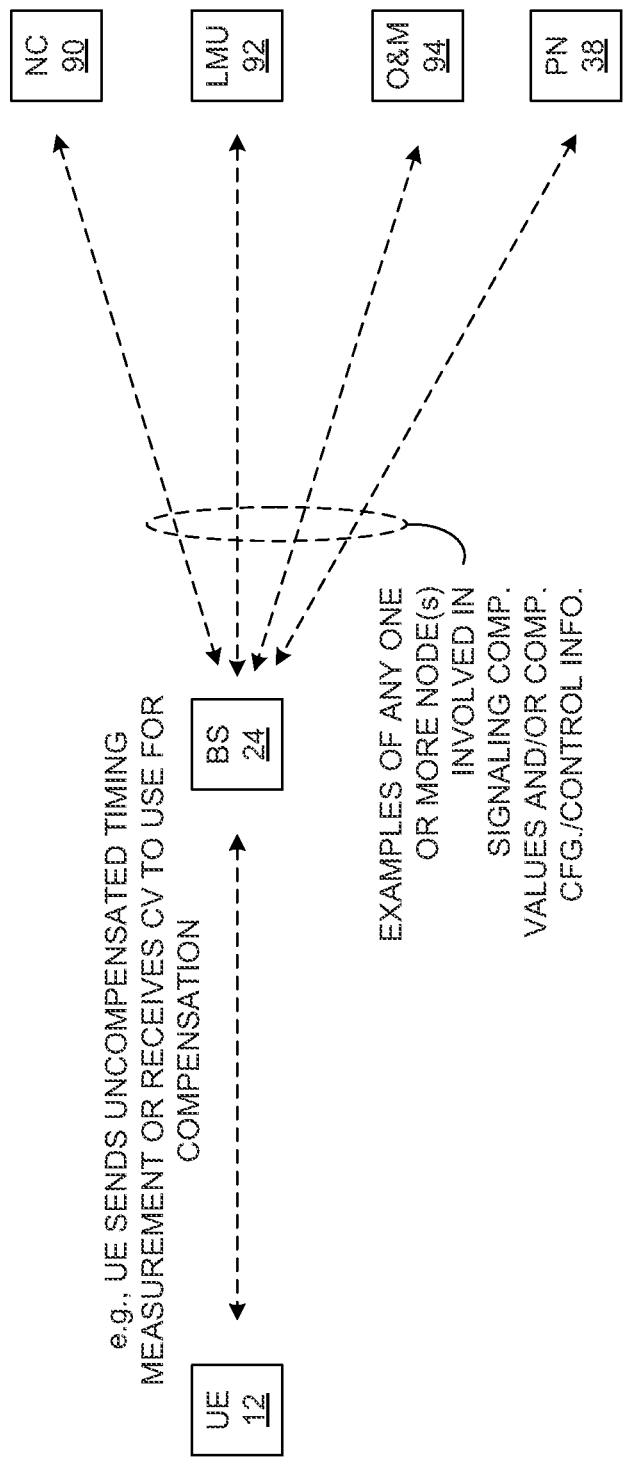
FIG. 8 is a block diagram of another example embodiment where timing compensation values or configuration/control information may be stored in one node of a wireless communication network and provided to another node in the network, for use in timing compensation.

FIG. 8 provides another example illustrating that various nodes may be involved in determining a timing measurement, deciding whether (or how) to compensate the timing measurement, and providing the compensation values (CVs) or configuration/control information to support such compensation. As was noted earlier, a timing measurement may be made in one node and then transferred to another node, either in raw or compensated form. If transferred in raw (uncompensated) form, then that other node may apply compensation, or may transfer it to yet another node for compensation. Moreover, the CV to use for compensation, e.g., a mapping table of CVs for different frequency distances (and/or velocities, RATs, propagation environment types, etc.) may be stored in the node applying the compensation, or may be maintained in a one node and signal to another node where compensation is applied.

In the figure, one sees a UE 12 communicatively coupled to a base station 24, and any one or more other nodes may be involved in compensating timing measurements by the base station 24 and/or the UE 12. Merely for purposes of illustration, one sees, in addition to the previously discussed positioning node 38, a type of network controller (NC) 90, an LMU 92, and a O&M node 94. Any one or more of these nodes may provide (directly or indirectly) timing compensation values or associated configuration/control information.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of compensating timing measurement values obtained in a wireless communication network having multiple carriers operating at different carrier frequencies, said method implemented in a single first node configured for operation in the wireless communication network and comprising:

obtaining, by the single first node, a first timing measurement value for a first radio signal transmitted by the single first node at a first carrier frequency to a single second node;

obtaining, by the single first node, a second timing measurement value for a second radio signal transmitted by the single first node at a second carrier frequency to the single second node, the second radio signal being associated with the first radio signal;

determining, by the single first node, whether timing compensation is needed for either or both of the first timing measurement value or the second timing measurement value, based at least in part, on an association with an emergency call and a frequency distance between the first carrier frequency and the second carrier frequency;

responsive to determining that timing compensation is needed, deriving, by the single first node, a compensation value based on frequency-dependent propagation differences between the first carrier frequency and the second carrier frequency, wherein adjusting either or both of the first timing measurement value or the second timing measurement value using the compensation value substantially accounts for the frequency-dependent propagation differences; and providing, by the single first node to the single second node or other node configured for operation in the wireless communication network, the compensation value for use in compensating either or both of the first timing measurement value or the second timing measurement value when used in processing by the single second node or the other node dependent on either or both of the first timing measurement value or the second timing measurement value.

2. The method of claim 1, wherein said processing comprises measurement processing for position estimation of the single first node or another positioning target.

3. The method of claim 1, wherein the first and second carrier frequencies belong to different frequency bands.

4. The method of claim 1, wherein a reference carrier frequency is pre-determined or decided prior to the compensation and the compensation is applied with respect to the reference carrier frequency.

5. The method of claim 1, wherein determining whether timing compensation is needed for either or both of the first timing measurement value or the second timing measurement value comprises at least one of: identifying the pair of radio carriers corresponding to the first and second carriers frequencies and determining whether timing compensation is indicated for the identified pair; or comparing the frequency distance to one or more defined frequency distance thresholds or ranges that determine whether timing compensation is needed.

6. The method of claim 1, further comprising determining the compensation value as a function of the frequency distance either by computing the compensation value according to an expression that depends at least on the frequency distance, or selecting, based on at least the frequency distance, a precomputed compensation value from among a plurality of precomputed compensation values.

7. The method of claim 1, wherein determining whether timing compensation is needed for either or both of the first timing measurement value or the second timing measurement value comprises deciding whether timing compensation is needed based on the frequency distance and further based on one or more parameters indicative of the propagation environment in which timing measurements associated with either or both of the first timing measurement value or the second timing measurement value were made.

8. The method of claim 7, wherein the one or more parameters include at least one of: a velocity calculation associated with a node that made the timing measurements; and a radio environment value indicating or bearing on the time dispersiveness of the propagation environment in which the timing measurements were made.

9. The method of claim 1, wherein the single first node is a user equipment and wherein the method includes determining either or both of the first timing measurement value or the second timing measurement value at the user equipment as one of: a received signal timing difference between the first and second radio signals; a receive-transmit signal timing difference involving the first and second radio signals; a round-trip-time measurement determined from the first and second radio signals; a one way propagation delay determined from the first and second radio signals or a timing advance determined from the first and second radio signals.

10. The method of claim 9, further comprising receiving at the user equipment signaling for use in determining the compensation value to use for compensating either or both of the first timing measurement value or the second timing measurement value.

11. The method of claim 10, wherein the signaling comprises radio resource control signaling from a base station or from a network controller in the wireless communication network, or comprises positioning protocol signaling from a positioning node in the wireless communication network.

12. The method of claim 1, wherein the single first node comprises one of a base station, a location measurement unit, a network controller or a positioning node, and wherein the method further includes receiving either or both of the first timing measurement value or the second timing measurement value at the single first node from the single second node or another node in the wireless communication network.

13. The method of claim 12, further comprising receiving the compensation value from the single first node at the single second node, for compensation of either or both of the first timing measurement value or the second timing measurement value.

14. The method of claim 1, wherein determining whether timing compensation is needed includes determining an accuracy requirement for either or both of the first timing measurement value or the second timing measurement value, such that timing compensation is or is not applied for a given frequency distance in dependence on the accuracy requirement applicable to either or both of the first timing measurement value or the second timing measurement value or applicable to a calculation dependent on either or both of the first timing measurement value or the second timing measurement value.

15. The method of claim 1, further comprising determining the compensation value to use for compensating either or both of the first timing measurement value or the second timing measurement value based on at least one of a parameter indicating the type of propagation environment in which the timing measurements were determined, and an accuracy requirement associated with either or both of the first timing measurement value or the second timing measurement value.

16. A single first node configured for operation in a wireless communication network having multiple carriers operating at different carrier frequencies, said single first node comprising:

a communication interface configured for communicating with one or more other nodes within the wireless communication network; and one or more processing circuits;

at least one memory including computer program code, the memory and the computer program code configured to, working with the processor, cause the node to:

obtain a first timing measurement value for a first radio signal transmitted from the single first node at a first carrier frequency to a single second node;

obtain a second timing measurement value for a second radio signal transmitted from the single first node at a second carrier frequency to the single second node, the second radio signal being associated with the first radio signal;

determine whether timing compensation is needed for either or both of the first timing measurement value or the second timing measurement value, based at least in part, on an association with an emergency call and a frequency distance between the first carrier frequency and the second carrier frequency;

derive a compensation value to provide the timing compensation, the compensation value based on frequency-dependent propagation differences between the first and second carrier frequencies of the first radio signal and second radio signal transmitted from the single first node to the single second node or one or more other nodes in the network, where adjusting either or both of the first timing measurement value or the second timing measurement value using the compensation value substantially accounts for the frequency-dependent propagation differences; and provide the compensation value to the single second node or another of the one or more other nodes for use in compensating either or both of the first timing measurement value or the second timing measurement value when used in processing dependent on said either or both of the first timing measurement value or the second timing measurement value.

17. The node of claim 16, wherein a reference carrier frequency is pre-determined or decided prior to the timing compensation and wherein the single first node is configured to apply the compensation with respect to the reference carrier frequency.

18. The node of claim 16, wherein the one or more processing circuits are configured to determine whether timing compensation is needed for either or both of the first timing measurement value or the second timing measurement value based on at least one of: identifying a pair of radio carriers corresponding to the first and second radio carriers and determining whether timing compensation is indicated for the identified pair; and comparing the frequency distance to one or more defined frequency distance thresholds or ranges that determine whether timing compensation is needed.

19. The node of claim 16, wherein the one or more processing circuits are configured to determine the compensation value as a function of the frequency distance either by computing the compensation value according to an expression that depends on the frequency distance, or selecting, based on the frequency distance, a precomputed compensation value from among a plurality of precomputed compensation values.

20. The node of claim 16, wherein the one or more processing circuits are configured to determine whether timing compensation is needed for either or both of the first timing measurement value or the second timing measurement value based on the frequency distance and further based on one or more parameters indicative of the propagation environment in which timing measurements associated with either or both of the first timing measurement value or the second timing measurement value were made.

21. The node of claim 20, wherein the one or more parameters include at least one of: a velocity calculation associated with a node that made the timing measurements; and a radio environment value indicating or bearing on the time dispersiveness of the propagation environment in which the timing measurements were made.

22. The node of claim 16, wherein the single first node is a user equipment and wherein the one or more processing circuits of the user equipment are configured to determine either or both of the first timing measurement value or the second timing measurement value as at least one of: a received signal timing difference between the first and second radio signals; a receive/transmit signal timing difference involving the first and second radio signals; a round-trip-time measurement determined from the first and second radio signals; a one way propagation delay determined from the first and second radio carriers or timing advance determined from the first and second radio signals.

23. The node of claim 22, wherein the communication interface comprises a wireless communication interface and wherein the single second node is a base station in communication with the user equipment and the user equipment is configured to receive, via the communication interface, signaling indicating the compensation value to use for compensating either or both of the first timing measurement value or the second timing measurement value.

24. The node of claim 23, wherein the signaling comprises radio resource control signaling from a base station in the wireless communication network, or comprises positioning protocol signaling from a positioning node in the wireless communication network, and wherein the user equipment is configured to implement at least one of a radio resource control protocol for processing radio resource control protocol signaling and a positioning protocol for processing positioning protocol signaling.

25. The node of claim 16, wherein the single first node comprises a base station or a positioning node, and wherein the one or more other node is user equipment in the wireless communication network.

26. The node of claim 25, wherein the single second node is configured to receive the compensation value from the single first node, for compensation of either or both of the first timing measurement value or the second timing measurement value.

27. The node of claim 16, wherein the one or more processing circuits are configured to determine whether timing compensation is needed further based on an accuracy requirement for either or both of the first timing measurement value or the second timing measurement value, such that timing compensation is or is not applied for a given frequency distance in dependence on the accuracy requirement applicable to either or both of the first timing measurement value or the second timing measurement value or applicable to a calculation dependent on either or both of the first timing measurement value or the second timing measurement value.

28. The node of claim 16, wherein the one or more processing circuits are configured to determine the compensation value to use for compensating either or both of the first timing measurement value or the second timing measurement value based on at least one of a parameter indicating the type of propagation environment in which timing measurements associated with either or both of the first timing measurement value or the second timing measurement value were determined, and an accuracy requirement associated with either or both of the first timing measurement value or the second timing measurement value.

29. The node of claim 16, wherein the one or more processing circuits comprises a timing measurement compensation circuit that is configured to apply the compensation value to either or both of the first timing measurement value or the second timing measurement value, thereby obtaining one or more compensated timing measurement values.

30. The node of claim 16, wherein the one or more processing circuits are configured to provide the one or more compensated timing measurement values for use in processing dependent on said either or both first timing measurement value or the second timing measurement value based on one of: providing the one or more compensated timing measurement values to a local processing circuit within the single first node, for use by the local processing circuit in performing said processing dependent on the one or more compensated timing measurement values; or providing the one or more compensated timing measurement values for transmission from a communication interface of the single first node, for sending the one or more compensated timing measurement values to the single second node or another of the one or more other nodes that performs said processing dependent on the one or more compensated timing measurement values.

31. The method of claim 1, wherein one of the single first node or the single second node is a user equipment that is moving, and the determination whether timing compensation is needed for either or both of the first timing measurement value or the second timing measurement value is based, at least in part, on how quickly the user equipment is moving.

* * * * *